US009231453B2

(12) United States Patent
Abe et al.

(10) Patent No.: US 9,231,453 B2
(45) Date of Patent: Jan. 5, 2016

(54) ELECTRIC ACTUATOR

(71) Applicant: Azbil Corporation, Tokyo (JP)

(72) Inventors: Takuji Abe, Tokyo (JP); Hiroaki Narita, Tokyo (JP); Makoto Saruwatari, Tokyo (JP); Hideaki Someya, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 223 days.

(21) Appl. No.: 13/949,694

(22) Filed: Jul. 24, 2013

(65) Prior Publication Data

US 2014/0028159 A1    Jan. 30, 2014

(30) Foreign Application Priority Data

Jul. 24, 2012  (JP) .................................. 2012-163544

(51) Int. Cl.
*H02P 1/00* (2006.01)
*H02K 11/00* (2006.01)
*F16K 31/04* (2006.01)
*F16K 31/05* (2006.01)

(52) U.S. Cl.
CPC .......... *H02K 11/0063* (2013.01); *F16K 31/042* (2013.01); *F16K 31/055* (2013.01)

(58) Field of Classification Search
CPC .......... E05B 47/00; G07F 11/18; G07F 11/60
See application file for complete search history.

(56) References Cited

U.S. PATENT DOCUMENTS

| 4,225,007 A * | 9/1980 | Voges ........................... 180/284 |
| 4,931,706 A * | 6/1990 | Gajewski ...................... 318/282 |
| 2014/0028159 A1* | 1/2014 | Abe et al. ..................... 310/68 A |

FOREIGN PATENT DOCUMENTS

| CN | 201836506 U | 5/2011 |
| JP | H11-101359 A | 4/1999 |
| JP | 4774207 B2 | 9/2011 |

OTHER PUBLICATIONS

Office Action having a mail date of May 6, 2015, issued in corresponding Chinese Patent Application No. 201310312577.1.

* cited by examiner

*Primary Examiner* — Shawki S Ismail
*Assistant Examiner* — Zoheb Imtiaz
(74) *Attorney, Agent, or Firm* — Troutman Sanders LLP

(57) ABSTRACT

An electric actuator includes a motor, an electricity storing body, a manual operating unit, a switch and a resetting unit. In a state wherein a controlled element has arrived at a first opening and a supply of power to the motor from the electricity storing body is cut off, the motor and the controlled element are in a non-linked state only while a button is pushed. The switch keeps a supply path of electric power open when the button has been pressed once. The resetting unit closes the switch at a point in time that the controlled element that is driven by the motor arrives at a specific second opening at a time of restoration of the external power supply in a state wherein the non-linked state of the motor and the controlled element by the button has been undone.

5 Claims, 21 Drawing Sheets

Background Art

Background Art

ELECTRIC ACTUATOR

CROSS REFERENCE TO RELATED APPLICATION

This application claims priority to Japanese Patent Application No. 2012-163544, filed on Jul. 24, 2012, the entire content of which being hereby incorporated herein by reference.

FIELD OF TECHNOLOGY

The present invention relates to an electric actuator for driving controlled elements such as valves and dampers.

BACKGROUND

Conventionally, in air-conditioning equipment, electric actuators have been used for performing operations for opening and closing valves that are installed within cold or hot water pipes, and operations for adjusting the openings of dampers in order to increase or decrease the flow rate of conditioned air that is supplied to an air-conditioned area through a duct.

In a normal electric actuator of this type, a motor is provided within the electric actuator, to operate so as to cause the opening of the controlled element such as a valve or a damper to go to a setting opening in response to a control command from an air conditioner controller.

With this type of electric actuator, if there is an interruption to the power that is supplied, the degree of opening of the controlled element is maintained at the operating opening from immediately prior to the power outage, and appropriate opening control is no longer performed.

Given this, there have been proposals, that have been put into practice, for electric actuators of a type wherein, if there is an interruption to the power that is supplied to the electric actuator, it is forcibly driven to a specific opening (such as fully closed) and maintains that specific opening until the power supply is again restored to the normal state. In the below, this type of electric actuator will be termed "an electric actuator with an emergency shutdown function."

At present, there are, specifically, two types of electric actuators with emergency shutdown functions that have been proposed, one type known as the spring return type, and the other type known as the secondary power supply driven type.

The spring return-type electric actuator is loaded with a return spring that applies a force on the driveshaft of the electric actuator so as to maintain a fully-closed state of the controlled element, where, when power is supplied, a motor is driven against the force applied by the return spring to adjust the opening of the controlled element, such as a valve or a damper, and if the power is interrupted the force applied by the return spring forcibly drives the controlled element, such as the valve or the damper, to the specific opening.

On the other hand, in the secondary power supply driven-type electric actuator, an electricity storing body structured from a storage battery or an electric double-layer capacitor or the like, is provided, where, when power is supplied, a motor is driven by the power supply to adjust the opening of the controlled element, such as a valve or a damper, and when the power is interrupted, the electricity storing body is used as the operating power supply to drive the electric motor to drive the controlled element, such as the valve or the damper, forcibly to the specific opening.

However, when these two types of electric actuators with emergency shutdown functions are compared, in the spring return type the force applied by the return spring acts in resistance to the driving by the motor during normal operation, requiring the use of a motor with a large torque in order to overcome this resistance, and thus there is the shortcoming that this causes the electric actuator to be large, heavy, and costly.

In contrast, with the secondary power supply driven type, there is no shortcoming such as in the spring return type, and in recent years there have been improvements in the storage capacity of the storage batteries or electric double layer capacitors that serve as the electricity storing body, causing the secondary power supply driven-type electric actuator to be advantageous.

FIG. 20 illustrates a motor driving circuit for an electric shutdown valve set forth in, for example, Japanese Unexamined Patent Application Publication H11-101359 ("the JP 359"). In this figure, 1 is a commercial power supply, 2 is a power supply switch, 3 is a constant voltage circuit for converting an AC voltage into a specific DC voltage, 4 is a relay, 5 is a motor (DC motor), 6 is an opening-side limit switch, 7 is a closing-side limit switch, 8 and 9 are contact points (relay contact points) of the relay 4, 10 is an electricity storing body (electric double layer capacitor), 11 is a diode, and 12 is a resistance.

In this motor driving circuit, when the power supply switch 2 is turned ON, a DC voltage is outputted from the constant voltage circuit 3, magnetically exciting the relay 4, causing the relay contact points 8 and 9 to both switch to the terminals 8a and 9a. At this time, the motor 5 is in an intermediate opening state, where the opening-side limit switch 6 is at the terminal 6a side and the closing-side limit switch 7 is at the terminal 7a side. Moreover, let us assume that a full-open instruction has been received as an opening instruction.

Given this, the motor 5 rotates to drive the valve in the opening direction. Following this, when the opening-side limit switch 6 operates to switch to the terminal 6b side, that is, when the valve is fully open, the motor 5 stops. On the other hand, the electricity storing body 10 is charged through the resistance 12.

If, in this state, a power outage were to occur, then the DC voltage would cease to be outputted from the constant voltage circuit 3, the magnetic excitation of the relay 4 would disappear, and the relay contact points 8 and 9 would switch to the respective terminal 8b and 9b sides. At this time, the electric power stored in the electricity storing body 10 would flow through the diode 11 and the closing-side limit switch 7 to be supplied to the motor 5, to run the motor 5 in the opposite direction, to drive the valve in the closing direction. When the closing-side limit switch 7 operates to switch to the terminal 7b side, that is, when the valve is fully closed, the motor 5 stops.

However, with the motor driving circuit illustrated in FIG. 20, during maintenance there are cases wherein one may wish to maintain the valve opening at an arbitrary position other than being fully closed with the power supply switch 2 OFF, and in such cases it is necessary to discharge the power that is stored in the electricity storing body 10.

That is, when, during maintenance, the power supply switch 2 is turned OFF, the motor 5 is forcibly driven by the electric power that is stored in the electricity storing body 10, because a situation that is identical to that of a power outage has occurred, so the valve will fully close. When, in such a state, one attempts to move this fully-closed valve in the opening direction, the closing-side limit switch 7 switches to the terminal 7a side, and the supply of electric power from the electricity storing body 10 to the motor 5 is restarted, so the motor 5 attempts to return the valve to the fully-closed state.

Consequently, when, at the time of maintenance, one wishes to turn the power supply switch 2 OFF and maintain the valve opening at an arbitrary position other than fully closed, it is necessary to discharge the electric power that is stored in the electricity storing body 10 until the motor no longer attempts to return the valve to the fully-closed state. Because of this, not only does this produce waiting time in the operation, waiting for the discharge to be complete, but also wastes the electric power that is discharged.

Note that Japanese Patent 4774207 ("the JP '207"), example, shows a shutdown valve equipped with switching means and power supply monitoring means between a rechargeable power supply (electricity storing body) and actuator (motor), where, when the power supply monitoring means detect a power outage, the switching means are turned ON to connect the rechargeable power supply to the actuator, where, when the actuator is operated by the connected rechargeable power supply and becomes fully closed, the switching means turn OFF, to terminate the connection between the rechargeable power supply and the actuator, where the valve can be opened using an opening/closing handle.

FIG. 21 illustrates a motor driving circuit contemplating the application of the technology shown in the JP '207. In this motor driving circuit, a switch 13 that is configured corresponding to the switching means described in the JP '207 is provided and a power supply monitoring portion 14, structured corresponding to the power supply monitoring means, is provided. The power supply monitoring portion 14 detects a power outage to turn the switch 13 ON.

In the configuration illustrated in this FIG. 21, when, at the time of maintenance, the power supply switch 2 is turned OFF, not only do the relay contact points 8 and 9 switch to the terminal 8b and 9b sides, but the switch 13 is turned ON by the power supply monitoring portion 14, and the electric power that is stored in the electricity storing body 10 is supplied to the motor 5 through the diode 11, the closing-side limit switch 7 and the switch 13. Doing so causes the motor 5 to rotate in the opposite direction, so the valve is driven in the closing direction. When the closing-side limit switch 7 operates to switch to the terminal 7b side, that is, when the valve is fully closed, the motor 5 stops. Moreover, when the valve is fully closed, the switch 13 is turned OFF.

Once the switch 13 has been turned OFF, then the OFF state is maintained regardless of the state of opening/closing of the valve. Because of this, when the handle is operated manually to drive the valve open, the electric power that is stored in the electricity storing body 10 is not supplied to the motor 5, notwithstanding the closing-side limit switch 7 operating to switch to the terminal 7a side. Because of this, it is possible to manually drive the valve open, even without discharging the electric power that is stored in the electricity storing body 10.

However, while, with this configuration, it is necessary to turn the switch 13 ON to return to the original state in order to restore the normal operating state after maintenance has been completed, when the operation for returning the switch 13 to ON (the operation for restoring the normal operating state) is performed manually, there is the possibility that there will be forgotten the restoration operation. Moreover, while one may consider providing timing means to turn the switch 13 ON after a specific amount of time has elapsed after the valve is closed, based on timing by the timing means, there is a problem that this constrains the time over which the valve can be opened and closed manually.

The present invention was created to solve such problems, and an aspect thereof is to provide an electric actuator wherein maintenance can be performed without completely discharging the electric power that is stored in the electricity storing body, without forgetfulness of the operation for restoring the normal operating state, and without time constraints.

SUMMARY

The present invention, in order to achieve this aspect, provides an electric actuator including a motor that receives a supply of electric power from an external power supply to drive a controlled element and an electricity storing body that is charged through receiving a supply of electric power from the external power supply. At a time wherein the external power supply is cut off, the motor is driven forcibly by electric power stored in the electricity storing body, and when the arrival of a controlled element, driven by the motor, at a specific first opening is detected, the supply of electric power from the electricity storing body to the motor is cut off. The electric actuator further inlcudes manual operating means wherein, in a state wherein the controlled element has arrived at the first opening and the supply of electric power to the motor from the electricity storing body is cut off, the motor and the controlled element are in a non-linked state only while a button is pushed, switching means that are provided in the supply path of electric power from the electricity storing body to the motor and keeps the supply path of electric power from the electricity storing body to the motor open when the button has been pressed once, and resetting means that close the switching means that are provided in the supply path of electric power from the electricity storing body to the motor, at a point in time that the controlled element that is driven by the motor arrives at a specific second opening at the time of restoration of the external power supply in a state wherein the non-linked state of the motor and the controlled element by the button has been undone.

Given the present invention, when, at the time of maintenance, the external power supply is cut off, the motor is forcibly driven by the electric power that is stored in the electricity storing body. Following this, when it is detected that the controlled element driven by the motor has reached a specific first opening (for example, fully closed), the supply of electric power from the electricity storing body to the motor is cut off. For example, when the arrival at fully-closed is detected by a closing-side limit switch, the supply of electric power from the electricity storing body to the motor is cut off.

In the present invention, switching means are provided in the supply path of electric power from the electricity storing body to the motor. These switching means are closed in the normal operating state. When an operator wishes to perform maintenance, the operator presses a button to place the motor and the controlled element in a non-linked state. When the button is pressed once, the switching means are opened and the supply path of electric power from the electricity storing body to the motor is continuously open. Moreover, while the button is pressed the motor and the controlled element are in a non-linked state. As a result, the operator is able to change the opening of the controlled element manually while pressing the button. In this case, the switching means are open, and so even though the opening of the controlled element is changed manually, there is no supply, to the motor, of the electric power that is stored in the electricity storing body, and thus there is no need to discharge the electric power that is stored in the electricity storing body.

After the operator has changed the opening of the controlled element manually, the non-linked state between the motor and the controlled element, due to the button, is released. When, in this state, the external power supply is restored, then, at the point in time that the controlled element, which is driven by the motor, arrives at a specific second opening (for example, fully open), the switching means provided in the supply path of electric power from the electricity storing body to the motor are closed. This causes the normal operating state to be restored automatically by switching the switching means automatically from the opened state to the closed state at the point in time at which power is supplied again, after the completion of maintenance. As a result, there will be no errors in the operation for restoring the normal operating state. Moreover, the controlled element can be operated manually until the power is restored, so there are no time constraints.

Given the present invention, a manual operating unit that places the motor and the controlled element into a non-linked state only while a button is pressed, a switch that keeps open the supply path of electric power from the electricity storing unit to the motor when the button is pressed once, and a resetting unit that closes the switch, which is provided in the supply path of electric power from the electricity storing body to the motor, at the point in time that controlled element, driven by the motor, arrives at a specific second opening, when the external power supply is restored when in a state wherein the non-linked state of the motor and the controlled element by the button has been released are provided, and thus it is possible to change the opening of the controlled element manually while pressing the button, and, because at the point in time that power is restored, the switch switches automatically from open to closed, automatically restoring the normal state of use, it is possible to perform maintenance without completely discharging the electric power that is stored in the electricity storing body, without the possibility of omission of the operation to restore to the normal state of use, and without having time constraints.

BRIEF DESCRIPTIONS OF THE DRAWINGS

FIG. 12 is a diagram for explaining the operation when the power supply switch of the electric actuator when the power supply switch is ON.

DETAILED DESCRIPTION

Figure 1:
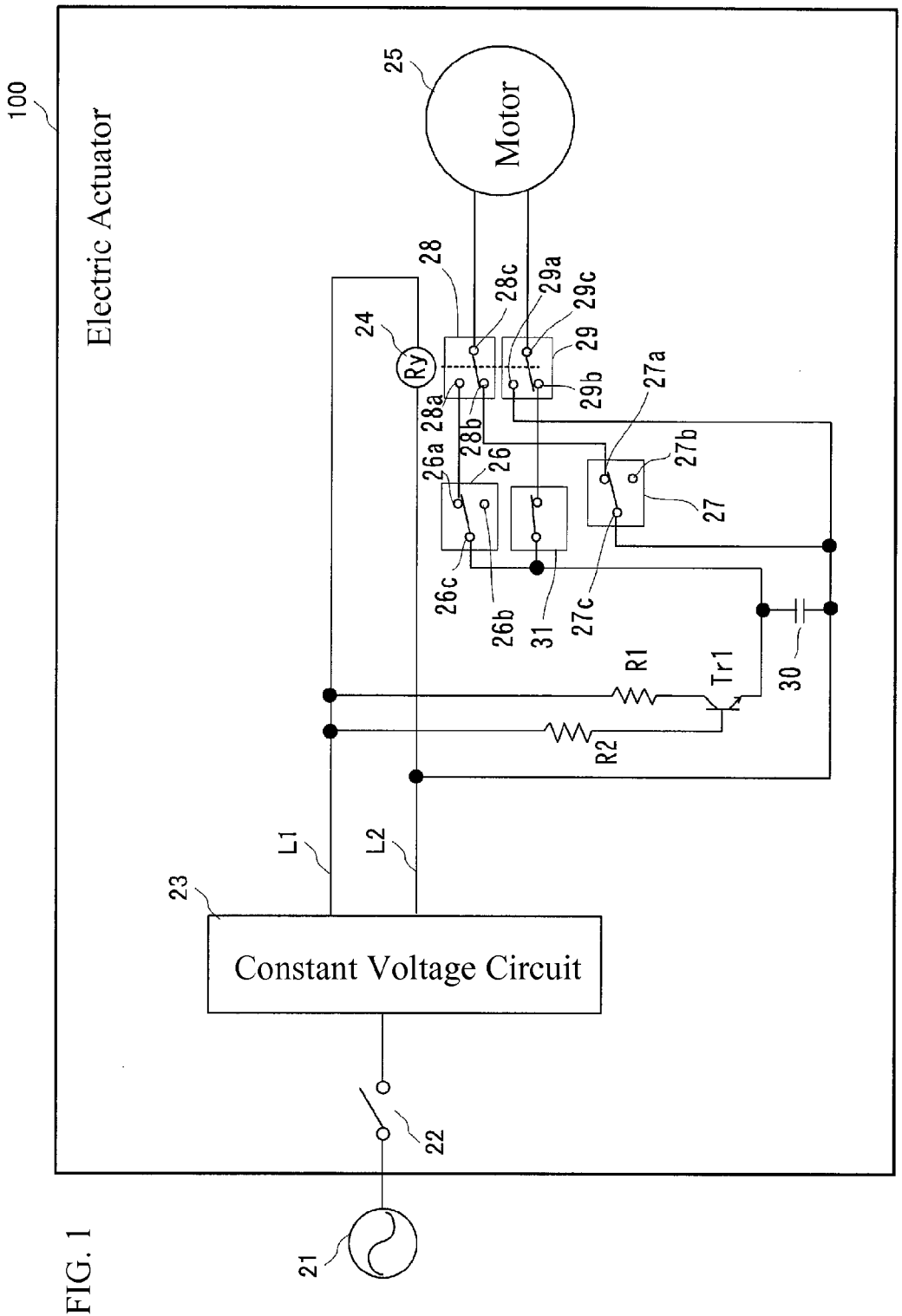
FIG. 1 is a circuit diagram illustrating the critical portions of an example of an electric actuator according to the present invention.

An example according to the present invention will be explained below in detail, based on the drawings. FIG. 1 is a circuit diagram illustrating the critical portions in an example of an electric actuator according to the present invention.

In FIG. 1, 21 is a commercial power supply, 22 is a power supply switch, 23 is a constant voltage circuit for converting an AC voltage into a specific DC voltage, 24 is a relay, 25 is a motor (DC motor) for driving the controlled element (not shown) such as a valve or a damper, 26 is a opening-side limit switch, 27 is a closing-side limit switch, 28 and 29 are contact points (relay contact points) of the relay 24, 30 is an electricity storing body (electric double-layer capacitor), 31 is an electricity storing body conductivity state switching switch corresponding to the switching means in the present invention, Tr1 is a transistor, and R1 and R2 are resistances.

In the electric actuator 100, the respective terminals of the motor 25 are connected to a common terminal 28c of the relay contact point 28 and a common terminal 29c of the relay contact point 29. Moreover, a normally-open contact point terminal 28a of the relay contact point 28 is connected to a terminal 26a of the opening-side limit switch 26, and a normally-closed contact point terminal 28b of the relay contact point 28 is connected to a terminal 27a of the closing-side limit switch 27. Furthermore, a normally-closed contact point terminal 29b of the relay contact point 29 is connected to a common terminal 26c of the opening-side limit switch 26 and also to one end of the electricity storing body 30 through the electricity storing body conductivity state switching switch 31, and a normally-open contact point terminal 29a of the relay contact point 29 is connected to a common terminal 27c of the closing-side limit switch 27 and also to the other terminal of the electricity storing body 30.

One terminal of the electricity storing body 30 is connected to an output line L1 for the DC voltage from the constant voltage circuit 23 through the transistor Tr1 and the resistance R1, and the other terminal of the electricity storing body 30 is connected to an output line L2 for the DC voltage from the constant voltage circuit 23. The resistance R2 is connected between the output line L1 for the DC voltage from the constant voltage circuit 23 and the base of the transistor Tr1. Moreover, the relay 24 is connected between the output lines L1 and L2 for the DC voltage from the constant voltage circuit 23.

Figure 2:
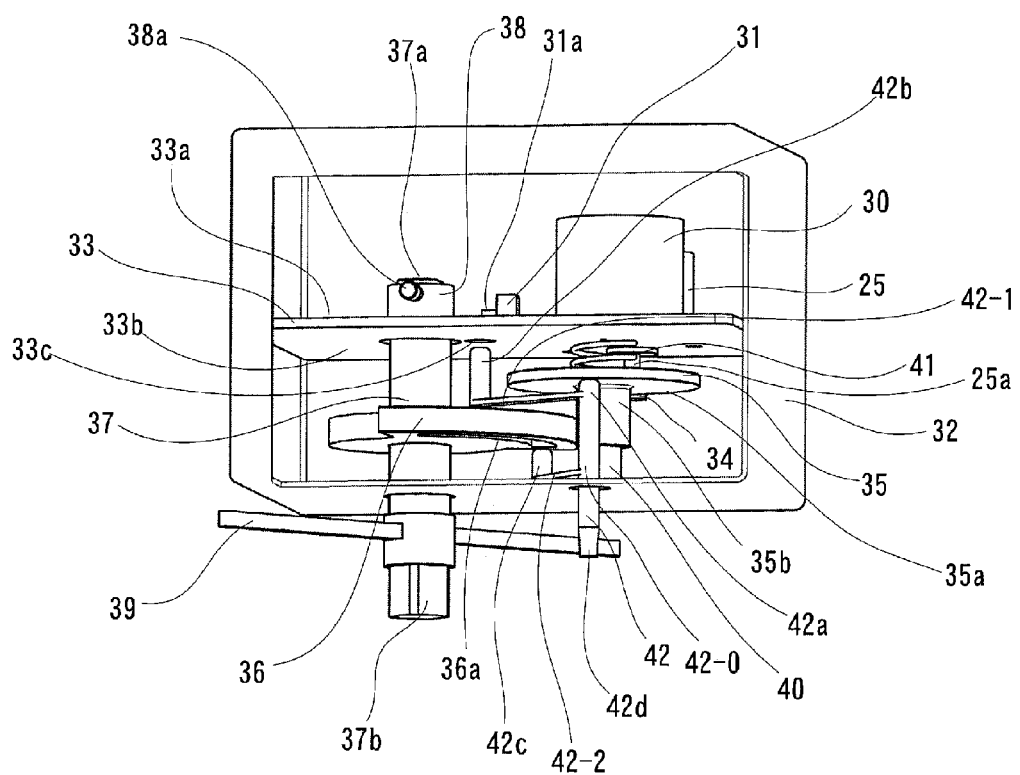
FIG. 2 is a perspective diagram of the driving force transmitting portion of an electric actuator.
Figure 3:
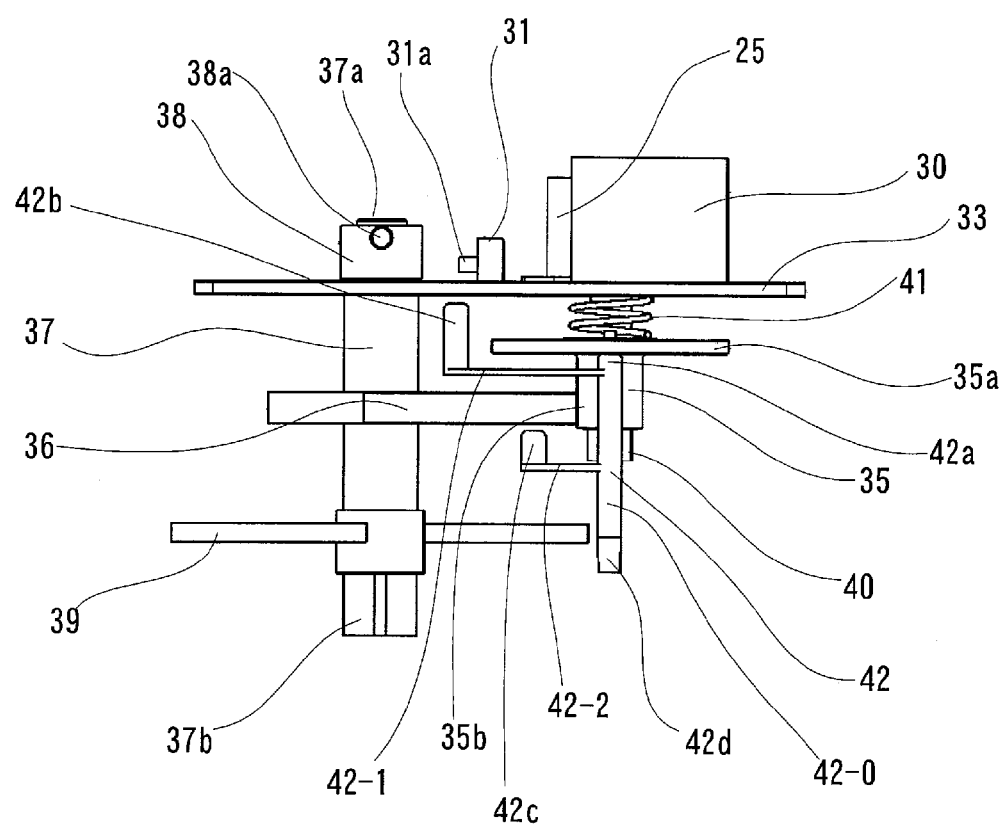
FIG. 3 is a front view diagram of a driving force transmitting portion of an electric actuator (a front view diagram showing only the structure of the critical portions, without the case attached).

FIG. 2 presents a perspective diagram of the driving force transmitting portion of this electric actuator 100. In this figure, 32 is a case, and 33 is a printed substrate that is contained within the case 32, where the motor 25, the electricity storing body 30, the electricity storing body conductivity state switching switch 31, and the like, are mounted on a top face 33a of the printed substrate 33, structuring the circuit illustrated in FIG. 1. FIG. 3 is a front view diagram of this driving force transmitting portion. Note that FIG. 3 shows only the critical structures, with the case 32 removed.

In the driving force transmitting portion, the driveshaft 25a of the motor 25 protrudes to the bottom face 33b side of the printed substrate 33, where a pinion gear 34 is secured fitted onto the driveshaft 25a of the motor 25, where a large diameter portion 35a of a gear 35 meshes with the pinion gear 34 of the motor 25, and a small diameter portion 35b of the gear 35 meshes with an output gear 36.

The output gear 36 is secured fitted onto an output shaft 37, where an upper portion 37a of the output shaft 37 protrudes to the top face 33a side of the printed substrate 33, and a cam (electricity storing body conductivity state switching switch cam) 38 is secured fitted on the upper portion 37a of the output shaft 37. This electricity storing body conductivity state switching switch cam 38 has a protrusion 38a that protrudes in a direction that is perpendicular to the axial direction of the output shaft 37. The electricity storing body conductivity state switching switch cam 38 that has this protrusion 38a corresponds to the resetting means in the present invention.

Moreover, a bottom portion 37b of the output shaft 37 extends outside of the case 32 and is connected to the controlled element, such as a valve, damper, or the like, not shown, where a manual opening/closing handle 39 is secured fitted onto the output shaft 37 at a position that is outside of the case 32.

Moreover, the gear 35, is attached at a position between the pinion gear 34 of the motor 25 and the output gear 36 so as to be able to move in the vertical direction with a pin 40, which is secured to the case 32 or the printed substrate 33, as a guide shaft, and a coil spring 41 is interposed between the large diameter portion 35a of the gear 35 and the bottom face 33b of the printed substrate 33. Moreover, a rod-shaped member 42 is provided as a member having a protruding portion 42a that supports the gear 35 from below.

Figure 4:
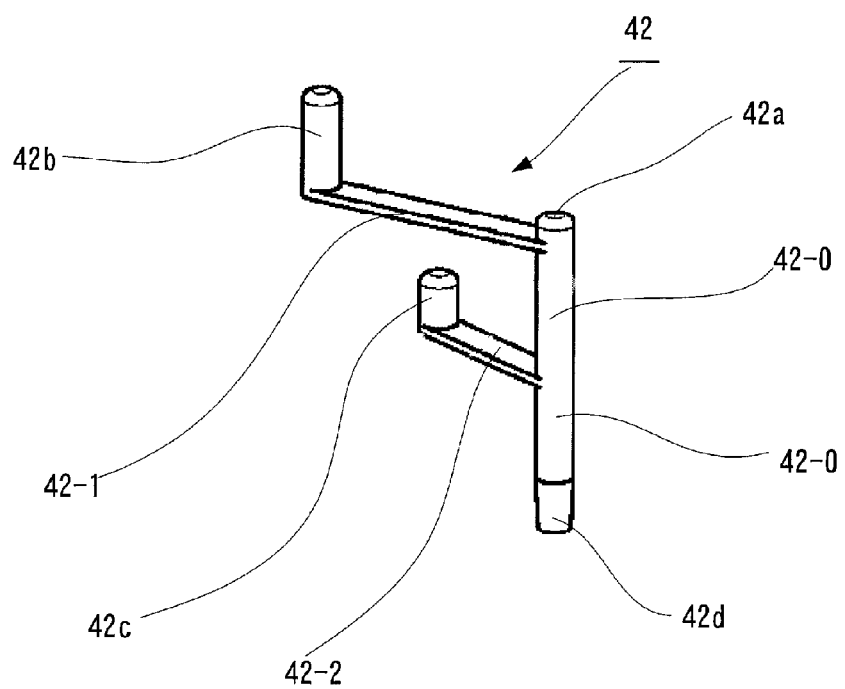
FIG. 4 is a perspective diagram of a rod member provided in the driving force transmitting portion of an electric actuator.

FIG. 4 presents a perspective diagram of the rod-shaped member 42. The rod-shaped member 42 has a main shaft 42-0, a first branch 42-1 that extends in a direction perpendicular to the axial direction of the main shaft 42-0, and a second branch 42-2. The first branch 42-1 extends from the tip end portion of the main shaft 42-0, and the second branch 42-2 extends from a center portion of the main shaft 42-0. The directions in which the first branch 42-1 and the second branch 42-2 extend are provided with a specific angular difference, where the first branch 42-1 is in a somewhat forward direction and the second branch 42-2 is somewhat rearward.

The tip end portion of the main shaft 42-0 of the rod-shaped member 42 is the protrusion 42a, described above. Moreover, a protrusion 42b that protrudes in the same direction as the protrusion 42a is provided on the tip end portion of the first branch 42-1, and a protrusion 42c that protrudes in the same direction as the protrusion 42a is provided on the tip end portion of the second branch 42-2. In the below, the protrusion 42a shall be termed the first protrusion, the protrusion 42b shall be termed the second protrusion, and the protrusion 42c shall be termed the third protrusion.

The rod-shaped member 42 correspond to the manual operating means in the present invention, and, in the state wherein the case 32 is attached, the back end portion 42d of the main shaft 42-0 extends through the case 32, to be positioned outside of the case 32. In the below, the back end portion of the main shaft 42-0 that is positioned to the outside of the case 32 shall termed a "button."

In the present example, the electricity storing body conductivity state switching switch 31 is a vertical slide switch, where normally a lever 31a thereof is in a position slid in the downward direction. The electricity storing body conductivity state switching switch 31 is closed when the lever 31a thereof is in the position that is slid in the downward direction, and is open when in the position that is slid in the upward direction. The close state is the normal state of use of the electricity storing body conductivity state switching switch 31.

A through hole 33c with a diameter that is larger than that of the second protrusion 42b of the rod-shaped member 42 is formed in a position facing the lever 31a of the electricity storing body conductivity state switching switch 31. As will be described below, when the button 42d of the rod-shaped member 42 is pressed, the second protrusion 42b of the rod-shaped member 42 enters into this through hole 33c.

Moreover, in the present example, an arcuate elliptical hole 36a is formed as the opening constraining means in the present invention in the output gear 36. The width of the arcuate elliptical hole 36a in the short direction is larger than the diameter of the third protrusion 42c of the rod-shaped member 42. As will be described below, when the button 42d of the rod-shaped member 42 is pressed, the third protrusion 42c of the rod-shaped member 42 enters into the arcuate elliptical hole 36a.

When the Power Supply is ON

When, in this electric actuator 100 (FIG. 1), the power supply switch 22 is turned ON, a DC voltage is outputted from the constant voltage circuit 23, the relay 24 is magnetically excited, and the relay contact points 28 and 29 respectively switch to the normally-open contact point terminal 28a and 29a sides. At this time, the motor 25 is in an intermediate opening state, where the opening-side limit switch 26 is at the terminal 26a side and the closing-side limit switch 27 is at the terminal 27a side. Moreover, let us assume that a full-open instruction has been received as an opening instruction.

Figure 12:
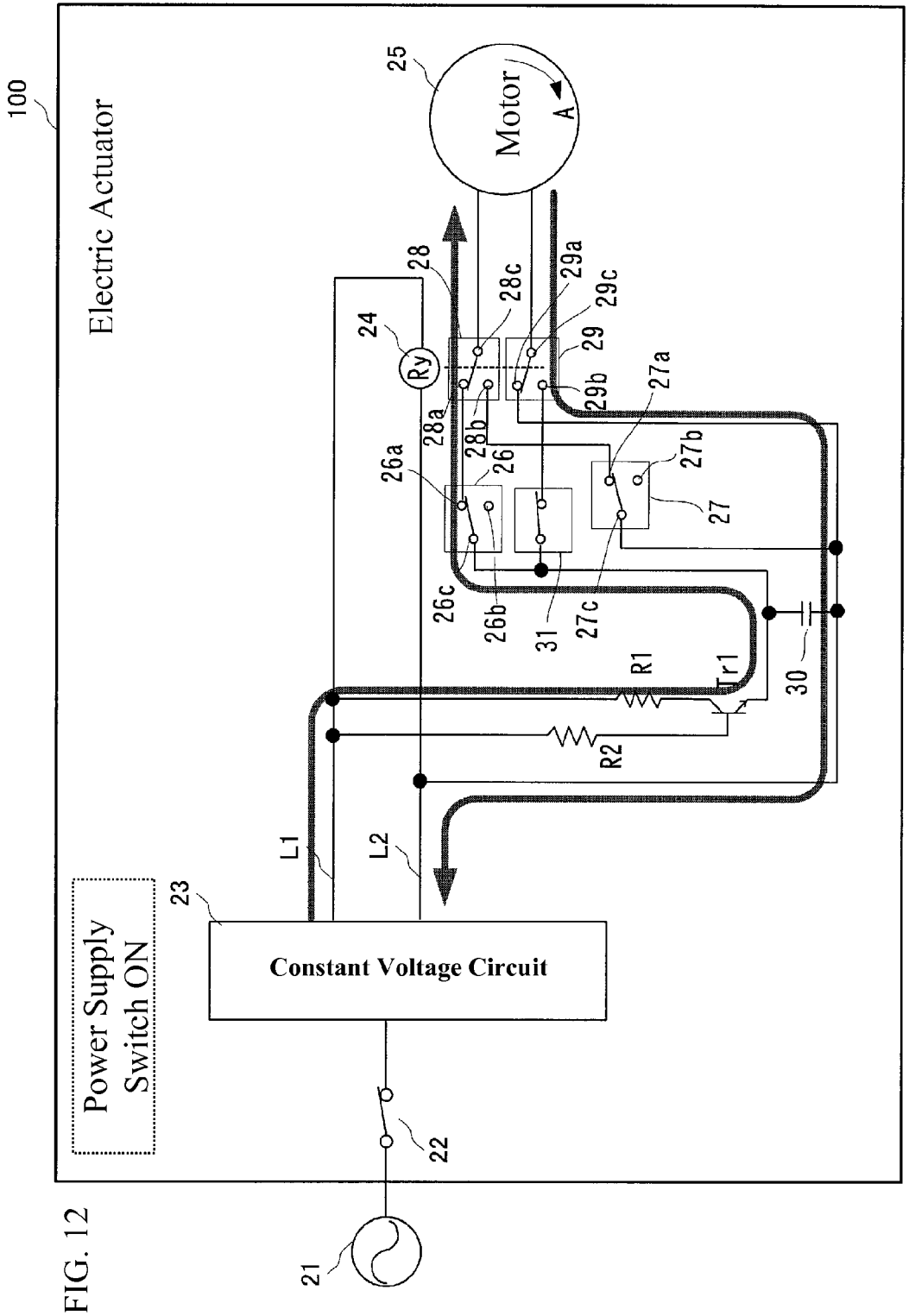

Given this, an electric current flows in the path indicated by the arrow in FIG. 12, so the motor 25 rotates in the direction of the arrow A, driving the controlled element in the opening direction. Given this, when the opening-side limit switch 26 operates to switch to the terminal 26b side, that is, when the controlled element is fully open, the motor 25 is stopped. On the other hand, the electricity storing body 30 receives a supply of electric power through the resistance R1 and the transistor Tr1, to be charged. Note that, during this operation, the electricity storing body conductivity state switching switch 31 is closed, as the normal state of use.

Emergency Shutdown when There is a Power Outage

Figure 13:
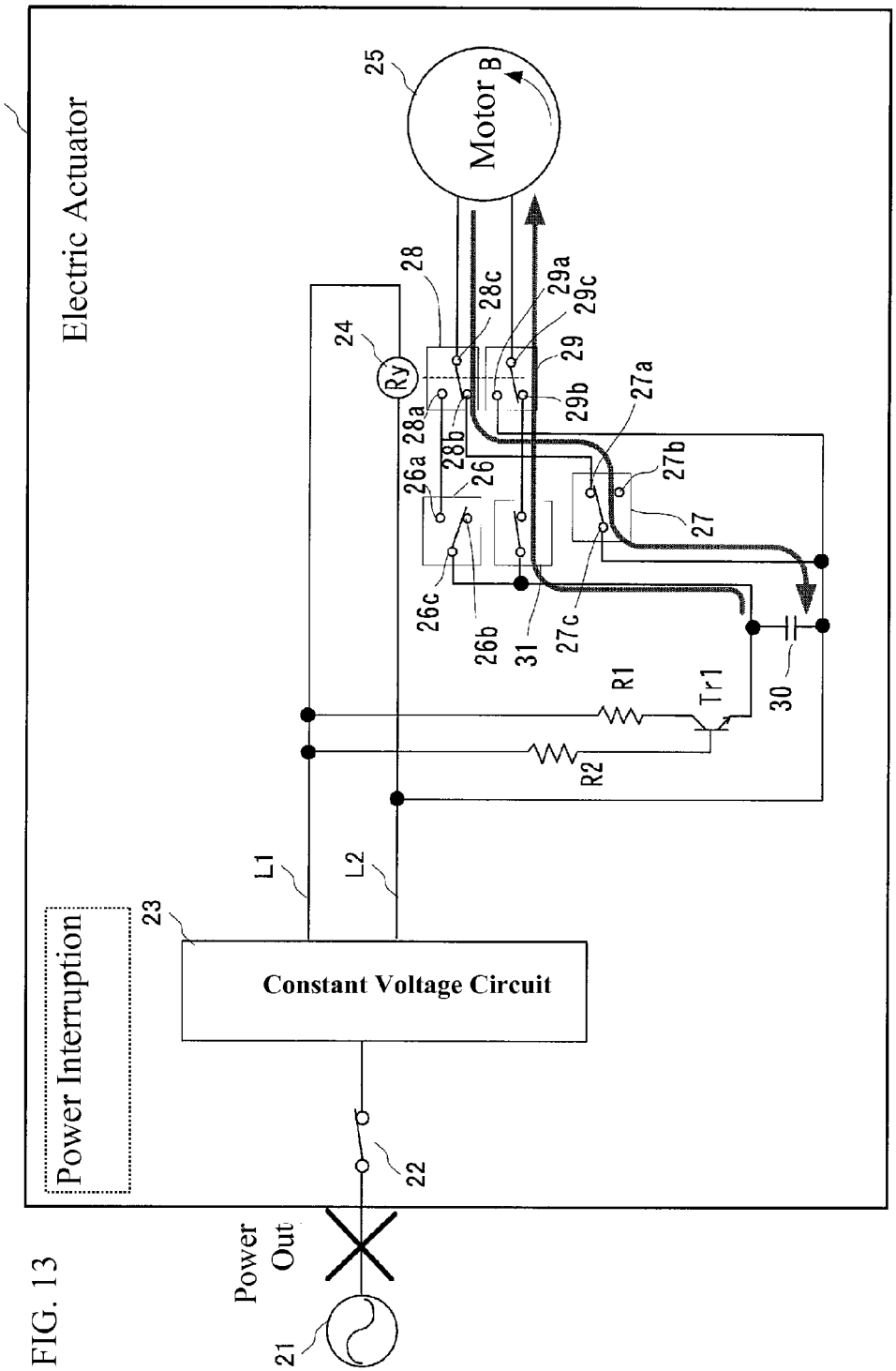
FIG. 13 is a diagram for explaining the operation of the electric actuator when there is a power outage.

If a power outage occurs when in this state, that is, if the external power supply is cut off (referencing FIG. 13) so that the DC voltage ceases to be outputted from the constant voltage circuit 23, the magnetic excitation of the relay 24 stops, and the relay contact points 28 and 29, respectively, switch to the normally-closed contact point terminal 28b and 29b sides. At this time, the electric power that is stored in the electricity storing body 30 causes a current to flow through the path indicated by the arrow in FIG. 13, causing the motor 25 to rotate in the direction of the arrow B (that is, to rotate in the reverse direction), to drive the controlled element in the closing direction. Given this, when the closing-side limit switch 27 operates to switch to the terminal 27b side, that is, when the controlled element is fully closed, the motor 25 stops.

Maintenance

Figure 14:
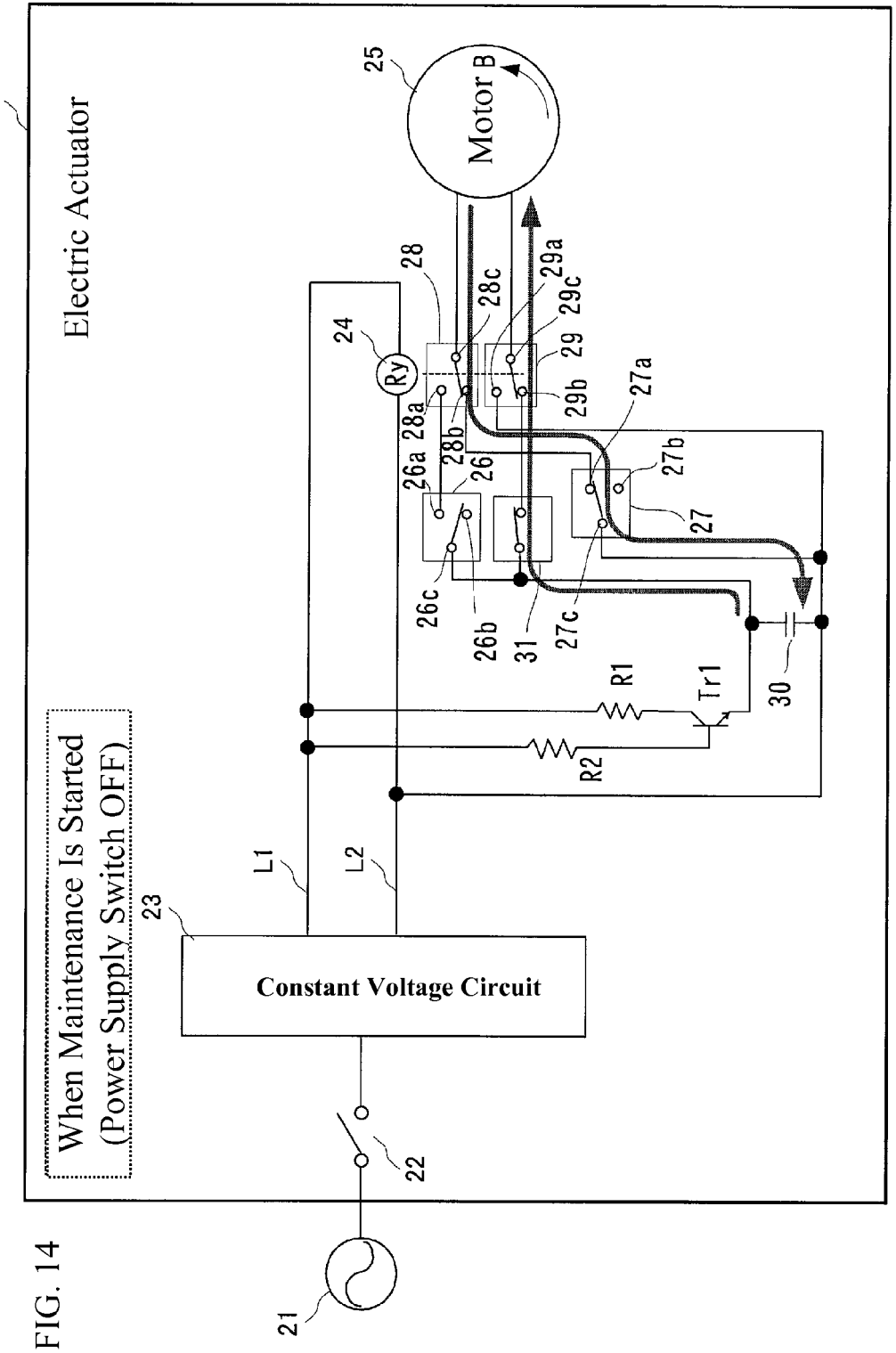
FIG. 14 is a diagram for explaining the operation of the electric actuator when the power supply switch is turned OFF at the time of maintenance.

When the power supply switch 22 is turned OFF at the time of maintenance (referencing FIG. 14), the DC voltage ceases to be outputted from the constant voltage circuit 23 because a situation that is identical to that of a power outage occurs. As a result, an electric current flows in the path indicated by the arrow in FIG. 14, causing the motor 25 to rotate in the direction of the arrow B (that is, to rotate in the reverse direction), to drive the controlled element in the closing direction, in the same manner as for the "Emergency Shutdown When There Is a Power Outage," described above. Given this, when the closing-side limit switch 27 operates to switch to the terminal 27b side, that is, when the controlled element is fully closed, the motor 25 stops.

Figure 5:
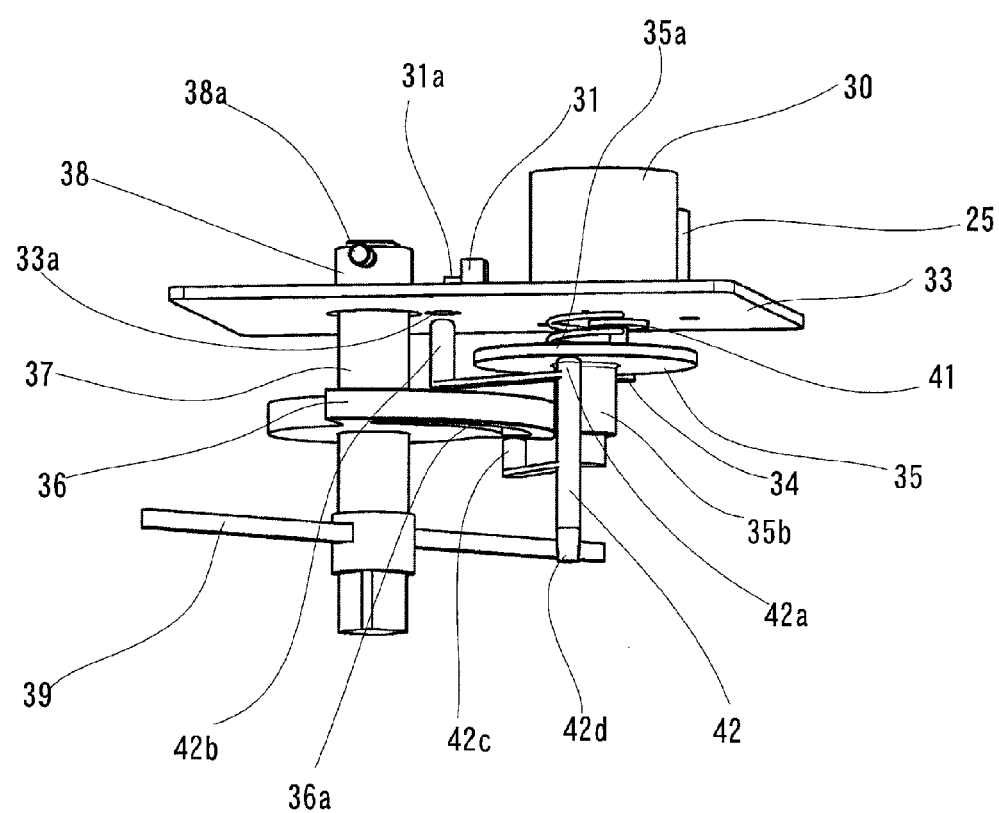
FIG. 5 is a perspective diagram of the driving force transmitting portion when the controlled element is fully closed.

FIG. 5 shows a perspective diagram of the driving force transmitting portion when the controlled element is fully closed. Note that in FIG. 5 as well, as with FIG. 3, only the critical structures are shown, with the case 32 removed. In the diagrams below, showing the driving force transmitting portion, only the critical structures are shown, with the case 32 removed.

Figure 15:
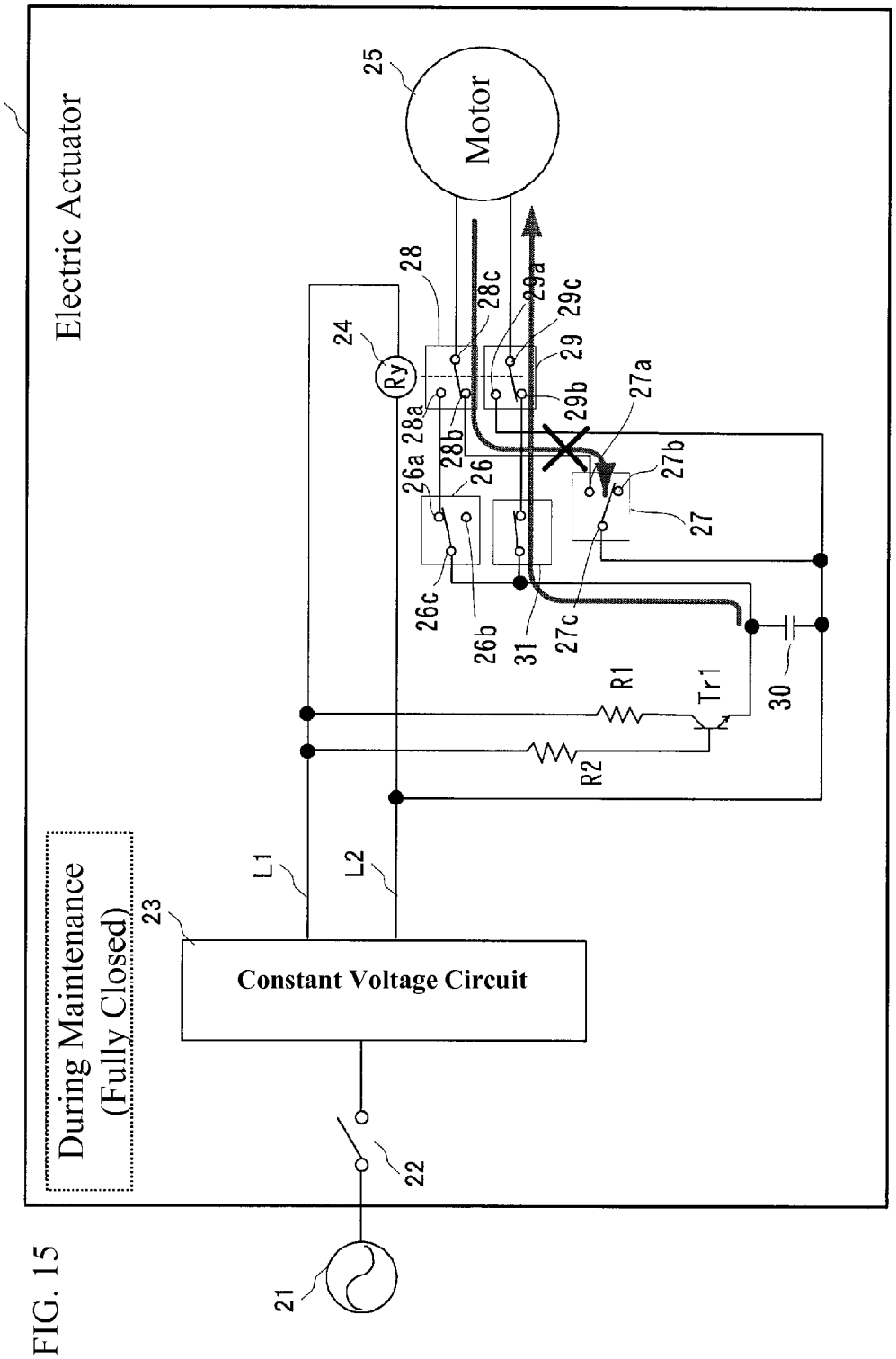
FIG. 15 is a diagram illustrating the state wherein the supply of electric power from the electricity storing body to the motor is cut off when the controlled element becomes fully closed.

In the state wherein the controlled element is fully closed and the supply of electric power to the motor 25 from the electricity storing body 30 is cut off (referencing FIG. 15), the third protrusion 42c of the rod-shaped member 42 is positioned at a position that faces one end portion of arcuate elliptical hole 36a (the end portion in the direction toward the back of the paper shown in FIG. 5) of the output gear 36. At this time, the protrusion 38a of the electricity storing body conductivity state switching switch cam 38, which is secured fitted on the upper portion 37a of the output shaft 37 is positioned in a position that is separated by 90°, at a rotated angle, relative to the position of the lever 31a of the electricity storing body conductivity state switching switch 31 (referencing FIG. 6).

Changing the Opening of the Controlled Element

If the operator wishes to hold the controlled element at some arbitrary position other than fully closed at the time of maintenance, the operator will rotate the manual opening/closing handle 39 in the direction of fully opening while pressing the button 42d of the rod-shaped member 42. The operation in this case will be described in detail below.

Figure 7:
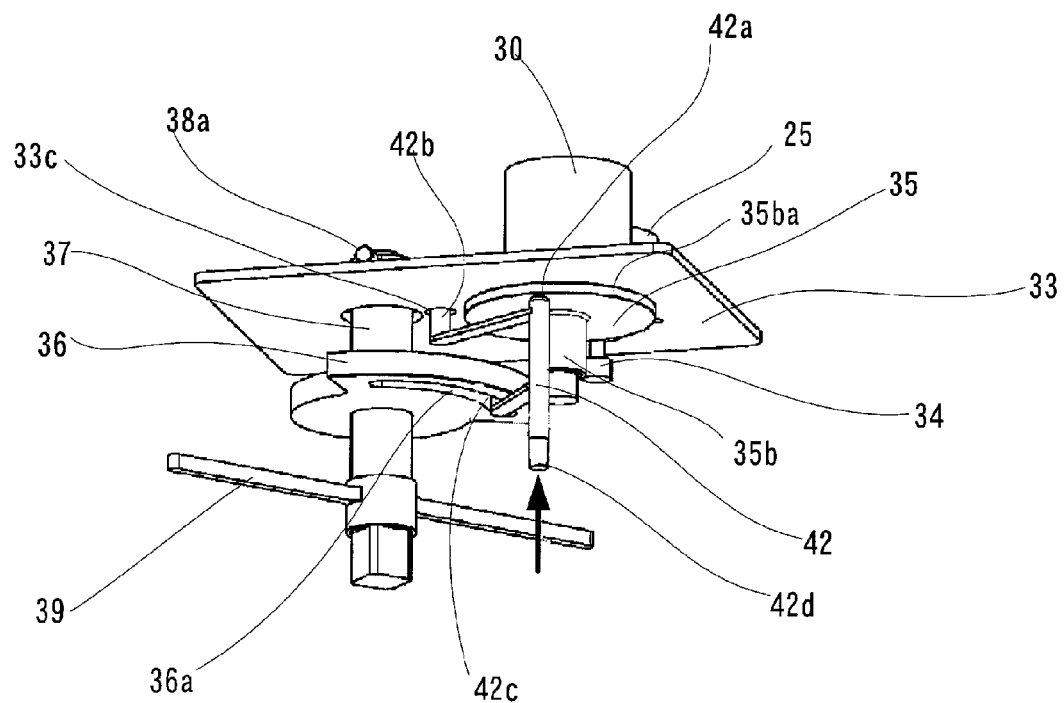
FIG. 7 is a perspective diagram illustrating the driving force transmitting portion when the button of the rod-shaped member is pressed in a state wherein the controlled element is fully closed.

When the button 42d of the rod-shaped member 42 is pressed, the gear 35 is pressed upwards, against the biasing force of the coil spring 41, by the first protrusion 42a of the rod-shaped member 42. As a result, the large diameter portion 35a of the gear 35 disengages from the pinion gear 34 of the motor 25, and the small diameter portion 35b of the gear 35 disengages from the output gear 36, causing the motor 25 and the output shaft 37 to go into a non-linked state (referencing FIG. 7). That is, while the button 42d of the rod-shaped member 42 is pressed, the motor 25 and the controlled element are in a non-linked state. At this time, the third protrusion 42c of the rod-shaped member 42 enters into the arcuate elliptical hole 36a of the output gear 36.

Figure 8:
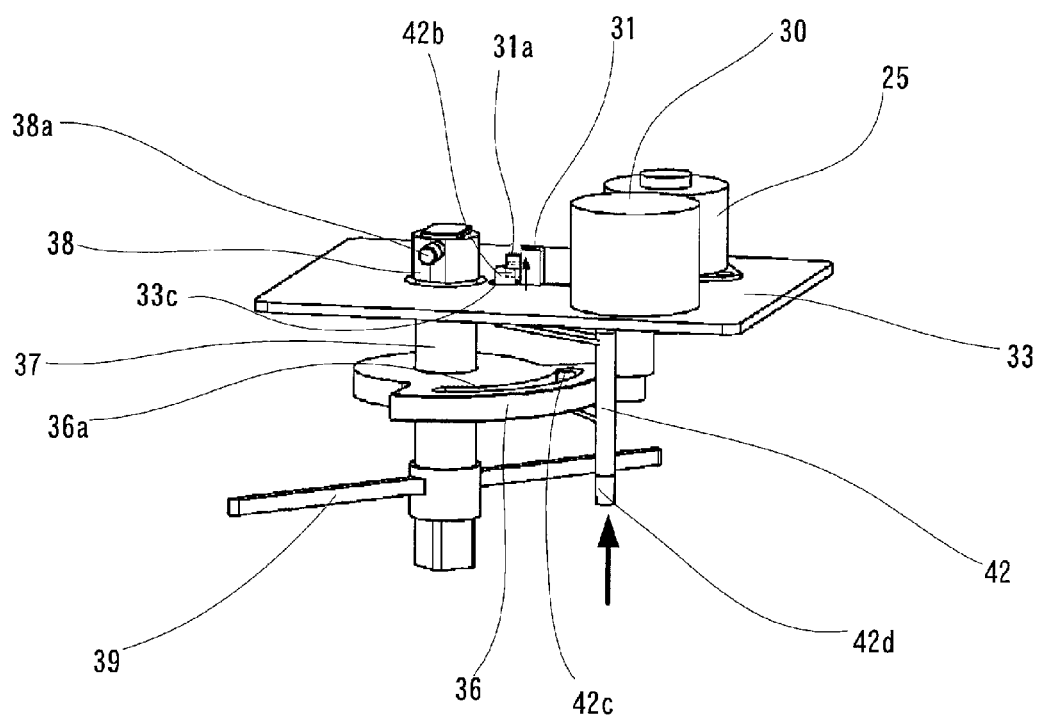
FIG. 8 is a perspective diagram illustrating the state wherein, at the point in time that button of the rod-shaped member is pushed, the electricity storing body conductivity state switching switch lever is pushed up.
Figure 16:
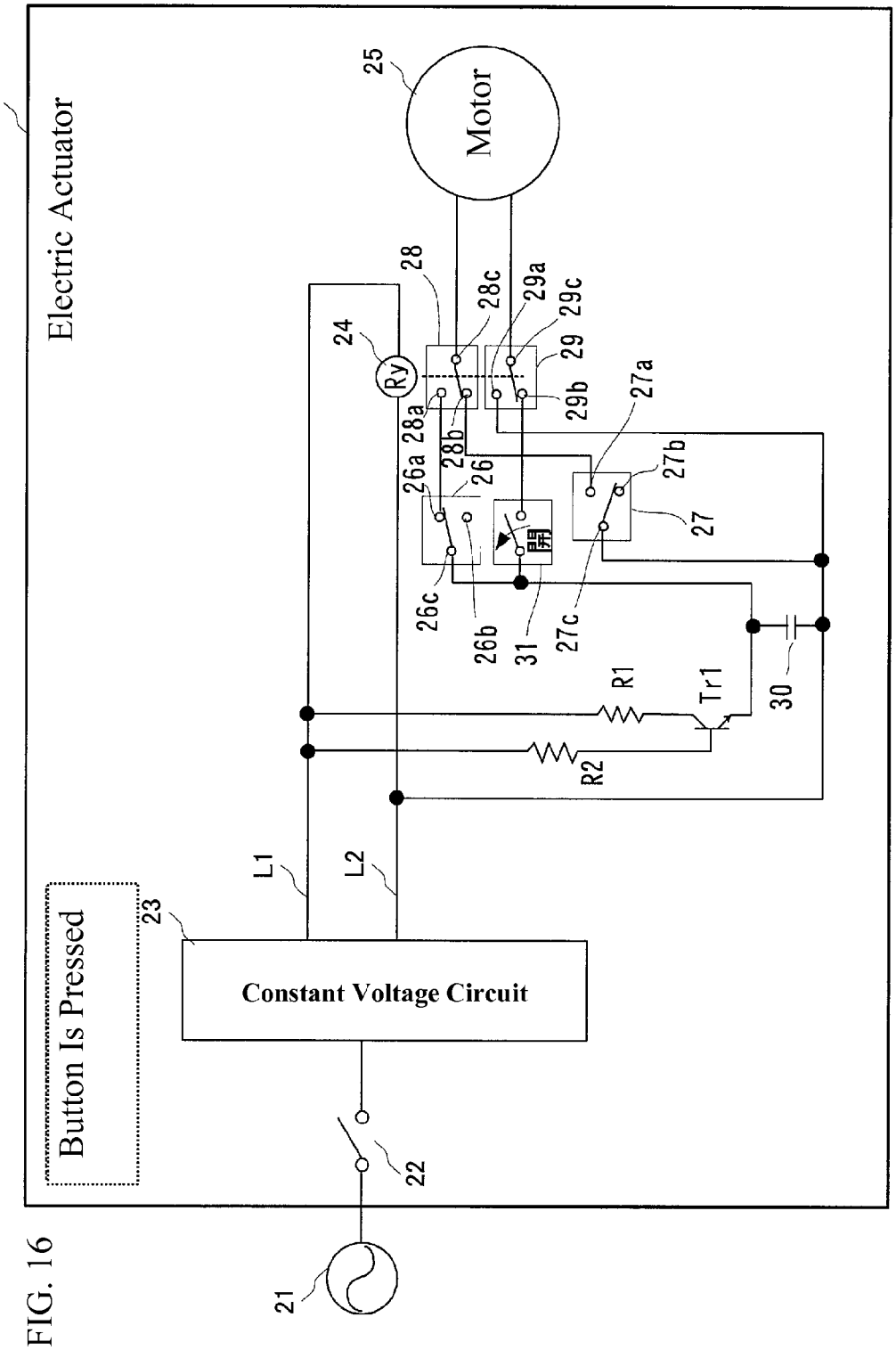
FIG. 16 is a diagram illustrating the state wherein the electricity storing body conductivity state switching switch is opened through pressing of the button of the rod-shaped member when the controlled element is in the fully-closed state.

On the other hand, when the button 42d of the rod-shaped member 42 is pressed, the second protrusion 42b of the rod-shaped member 42 enters into the through hole 33c of the printed substrate 33, and pushes up lever 31a of the electricity storing body conductivity state switching switch 31 through the through hole 33c (referencing FIG. 8). This opens the electricity storing body conductivity state switching switch 31 (referencing FIG. 16).

The electricity storing body conductivity state switching switch 31, when opened by the lever 31a being pressed up, maintains the open state until the lever 31a is pressed down again. That is, once the button 42d of the rod-shaped member 42 is pressed, the electricity storing body conductivity state switching switch 31 will be open, and the electricity storing body conductivity state switching switch 31 will maintain this open state, so the supply path of electricity from the electricity storing body 30 to the motor 25 will remain open.

Figure 9:
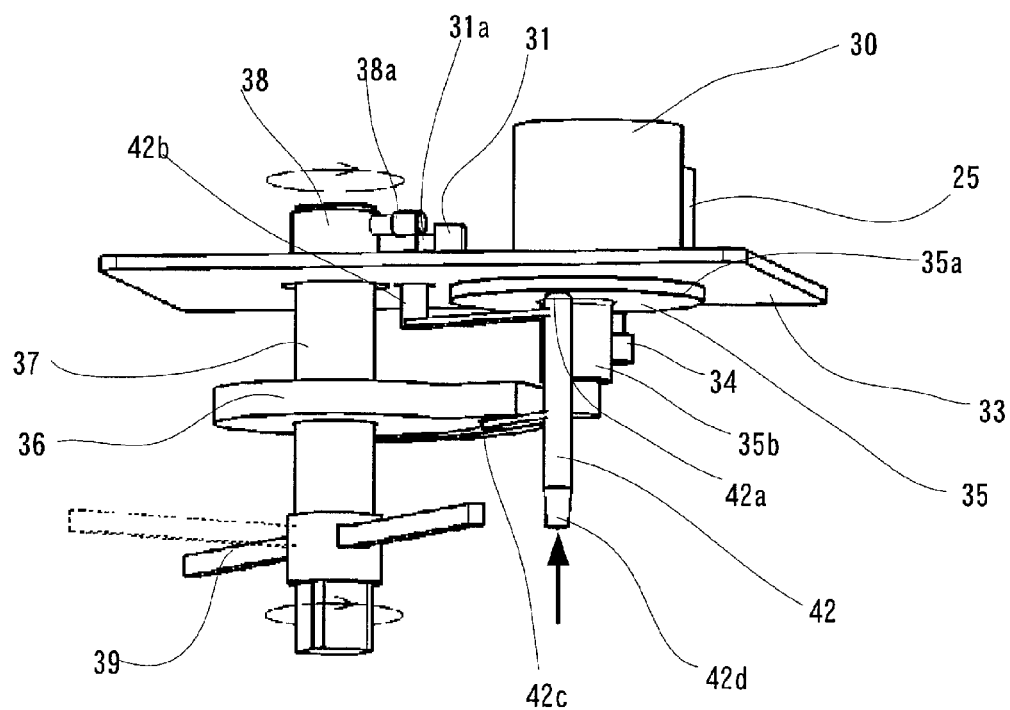
FIG. 9 is a perspective diagram illustrating the state wherein the manual opening/closing handle is used to rotate the output shaft while the button of the rod-shaped member is pushed.
Figure 17:
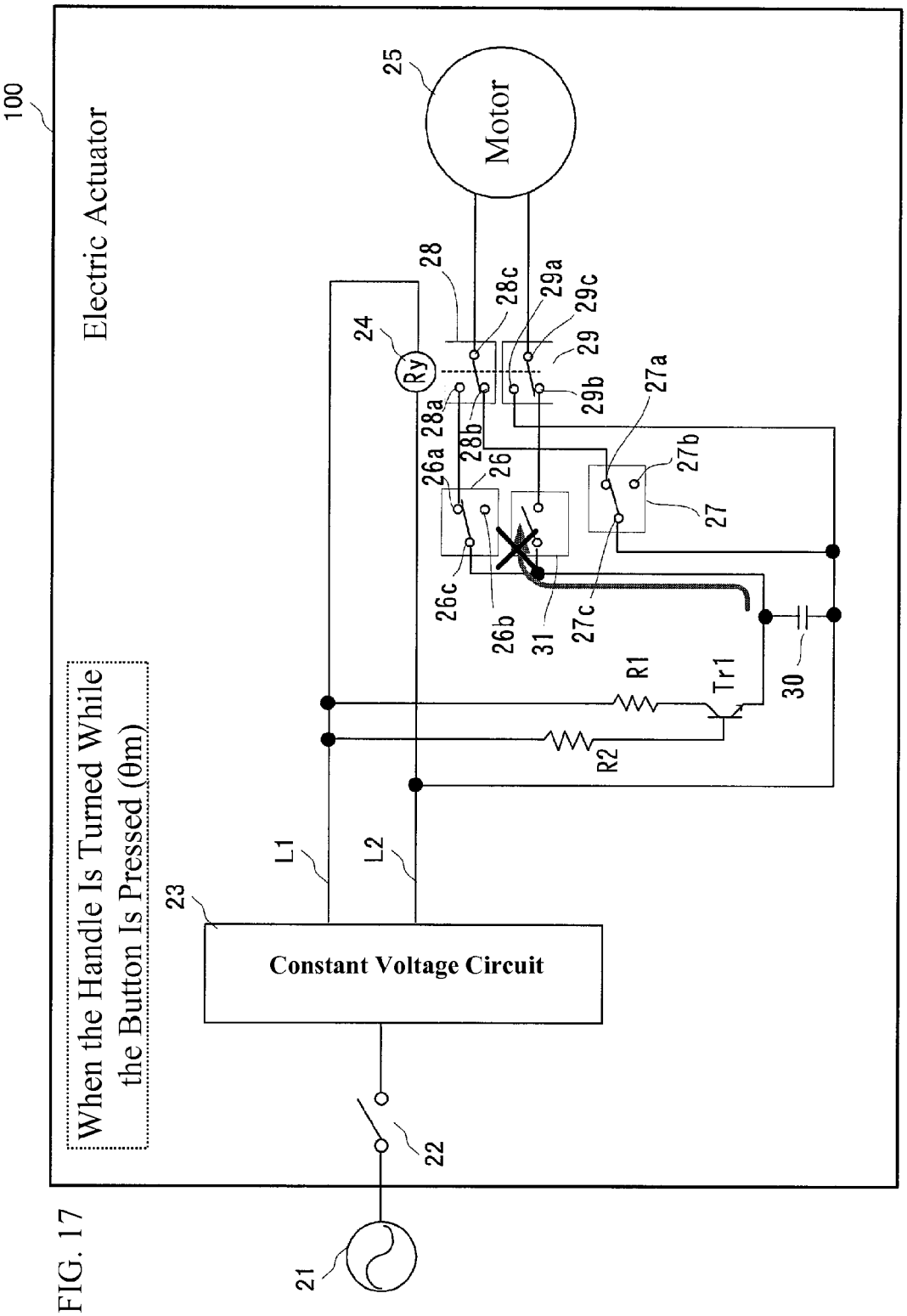
FIG. 17 is a diagram illustrating the state wherein electric power is not supplied from the electricity storing body to the motor even though the manual opening/closing handle has been turned while the button of the rod-shaped member is pressed.

While button 42d of the rod-shaped member 42 is pressed, the motor 25 and the controlled element are in a non-linked state, and thus it is possible to rotate the output shaft 37 easily using the manual opening/closing handle 39. If, at this time, the output shaft 37 is rotated using the manual opening/closing handle 39 while the button 42d of the rod-shaped member 42 is pressed (referencing FIG. 9), the closing-side limit switch 27 will be activated and will switch to the terminal 27a side (referencing FIG. 17), opening the electricity storing body conductivity state switching switch 31, so that the electric power that is stored in the electricity storing body 30 will not be supplied to the motor 25. As a result, it is possible to maintain the controlled element manually in an arbitrary position other than fully closed, even without discharging the electric power that is stored in the electricity storing body 30.

Figure 10:
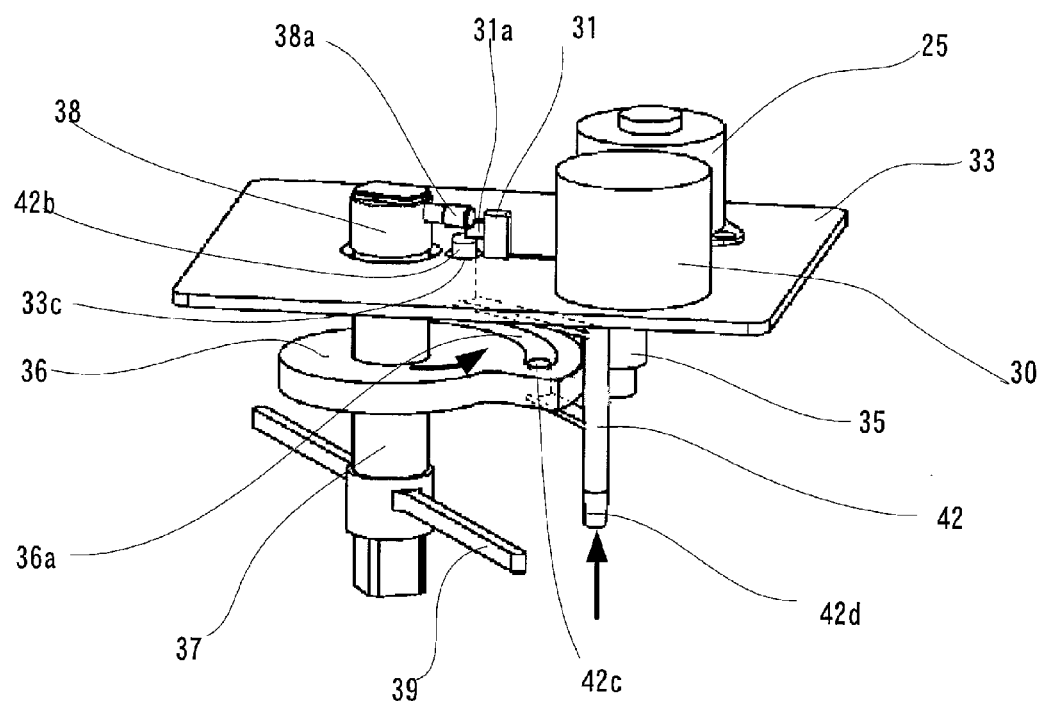
FIG. 10 is a diagram illustrating the state wherein the rotation of the output shaft using the manual opening/closing handle is constrained.

However, the rotation of the output shaft 37 using the manual opening/controlling handle 39 is constrained by the third protrusion 42c of the rod-shaped member 42, which protrudes into the arcuate elliptical hole 36a of the output gear 36, striking against the edge face of the other end portion (the end portion toward the front of the paper, shown in FIG. 10) of the arcuate elliptical hole 36a.

Figure 6:
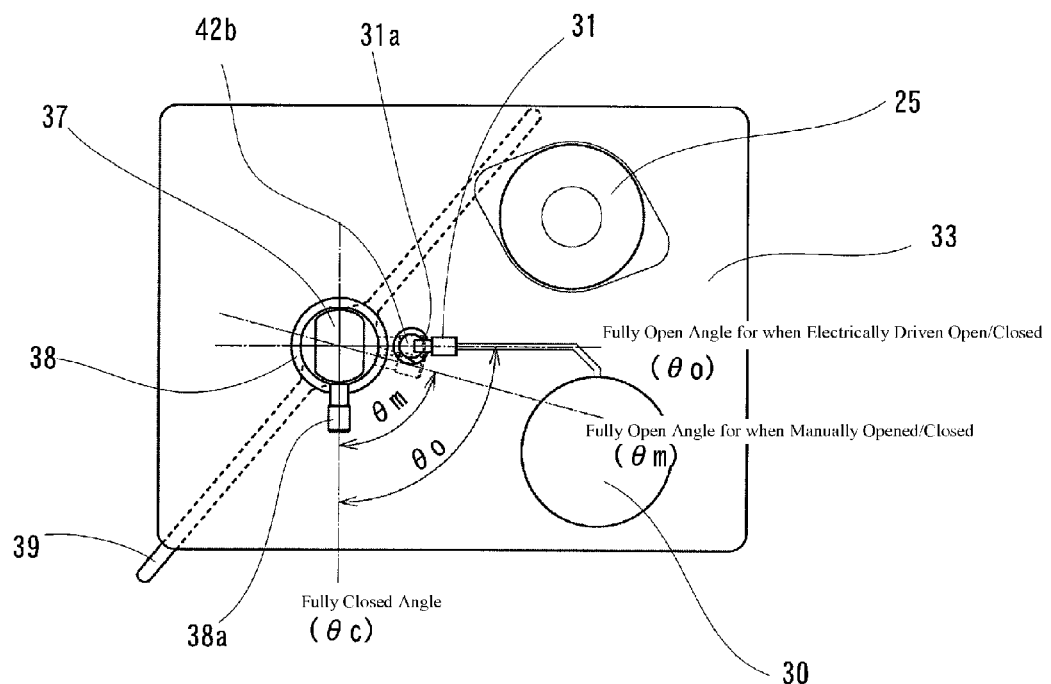
FIG. 6 is a diagram, viewed from the top, of the driving force transmitting portion when the controlled element is fully closed.

That is, as illustrated in FIG. 6, if the angle of the output shaft 37 when the opening of the controlled element is fully open at the time of electrically-driven opening/closing is defined as fully closed angle θc, and the angle of the output shaft 37 when the opening of the controlled element at the time of electrically-driven opening/closing is fully open is defined as the fully open (the fully open angle for when electrically driven open/closed) is defined as θo, then the fully open angle of the output shaft 37 when manually opening/closing (the fully open angle at the time of manual opening/closing) is constrained by the third protrusion 42c of the rod-shaped member 42 contacting the edge face of the other end portion of the arcuate elliptical hole 36a to θm, which is smaller than θo (θm<θo). Note that although θm<θo, θm is a value that is extremely near to θo.

When pressing of the button 42d of the rod-shaped member 42 is terminated, the gear 35 is pressed downward by the biasing force of the coil spring 41 so that the large diameter portion 35a of the gear 35 engages with pinion gear 34 of the motor 25 and the small diameter portion 35b of the gear 35 engages with the output gear 36, causing the motor 25 and the controlled element to go into the linked state. Moreover, the second protrusion 42b of the rod-shaped member 42 is pulled out from the through hole 33c of the printed substrate 33, and the third protrusion 42c of the rod-shaped member 42 is pulled out from the arcuate elliptical hole 36a of the output gear 36.

In this case, the motor 25 and the controlled element are in the linked state, and thus the output shaft 37 can no longer be open/closed manually, that is, the output shaft 37 can no longer be rotated using the manual opening/closing handle 39. At this time, the electricity storing body conductivity state switching switch 31 is still in the state where the lever 31a is pressed upward, and thus the path for supplying electric power from the electricity storing body 30 to the motor 25 remains open.

Completion of Maintenance

Figure 18:
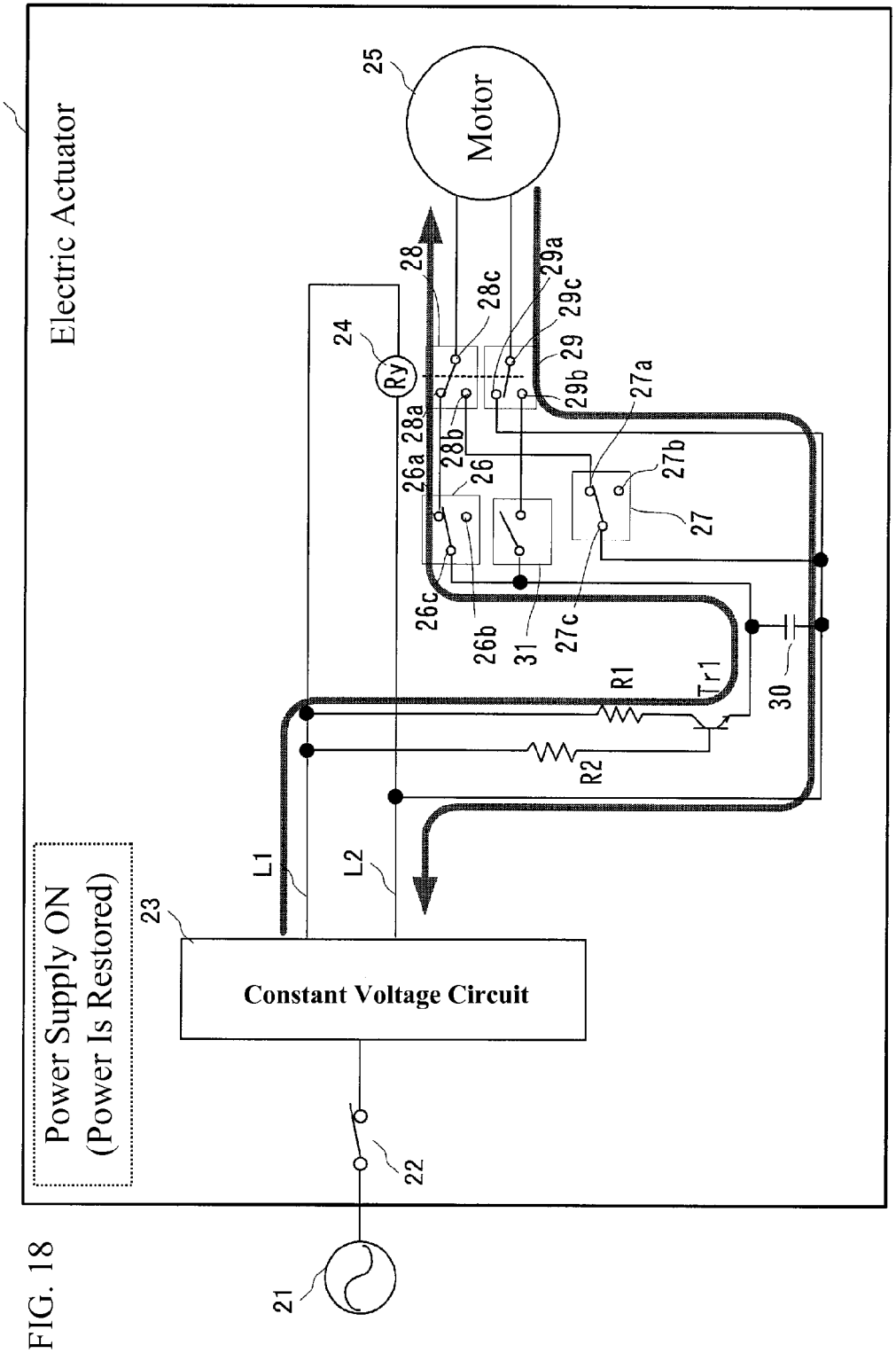
FIG. 18 is a diagram illustrating a state wherein power supply switch has been turned ON (the power is restored) at the conclusion of maintenance.

When, after maintenance has been completed, the power supply switch 22 is turned ON, that is, when the external power is restored to restore the powered state (referencing FIG. 18), the relay 24 is operated through the receipt of the DC voltage from the constant voltage circuit 23, and the relay contact points 28 and 29 switch respectively to the normally-open contact point terminals 28a and 29a. As a result, the operations in response to an opening instruction for the controlled element are restarted from a state wherein the opening of the controlled element, at the time of maintenance, was maintained at an arbitrary position other than fully-closed.

Figure 11:
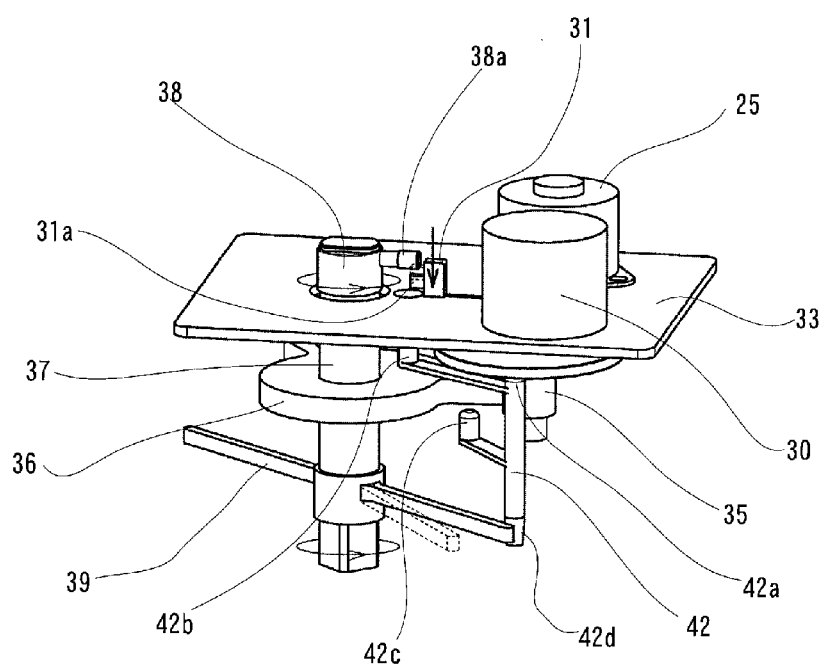
FIG. 11 is a perspective diagram illustrating the state wherein the lever of the electricity storing body conductivity state switching switch is pressed down at the point in time that power is restored.
Figure 19:
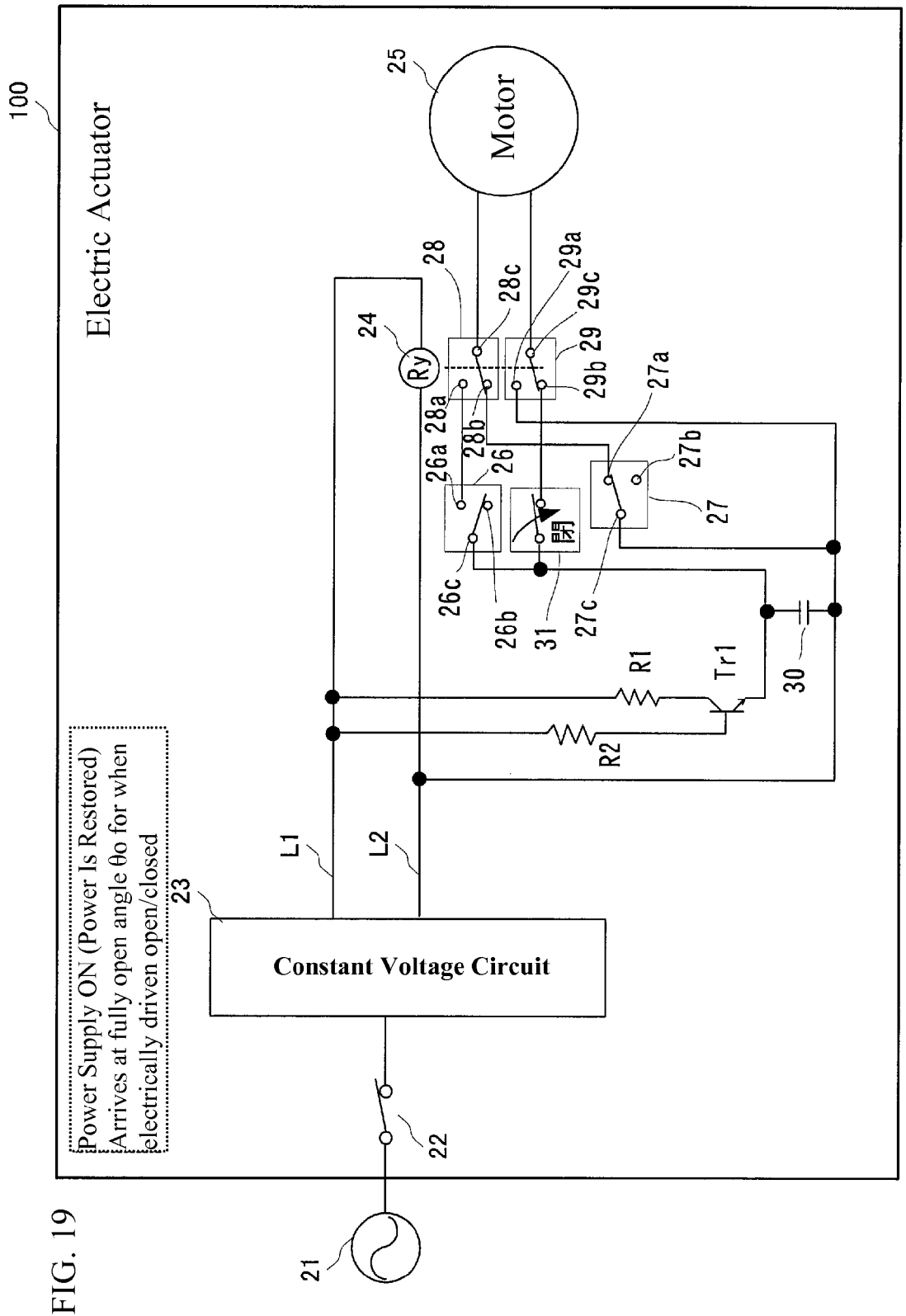
FIG. 19 is a diagram illustrating the state wherein the electricity storing body conductivity state switching switch is closed by the lever of the electricity storing body conductivity state switching switch being pressed down at time when power is restored.
Figure 20:
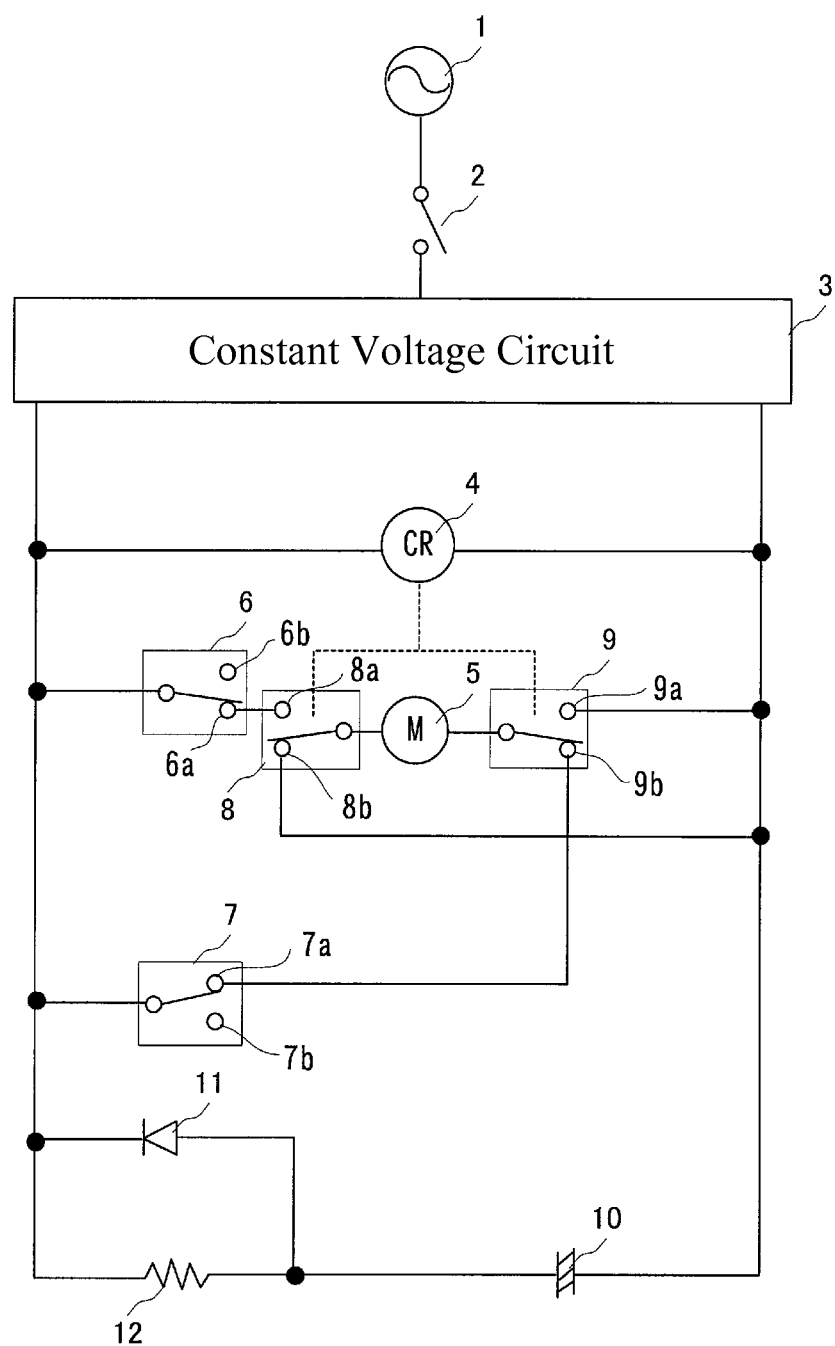
FIG. 20 is a diagram illustrating a motor driving circuit for an electric shutdown valve set forth in the JP 359.
Figure 21:
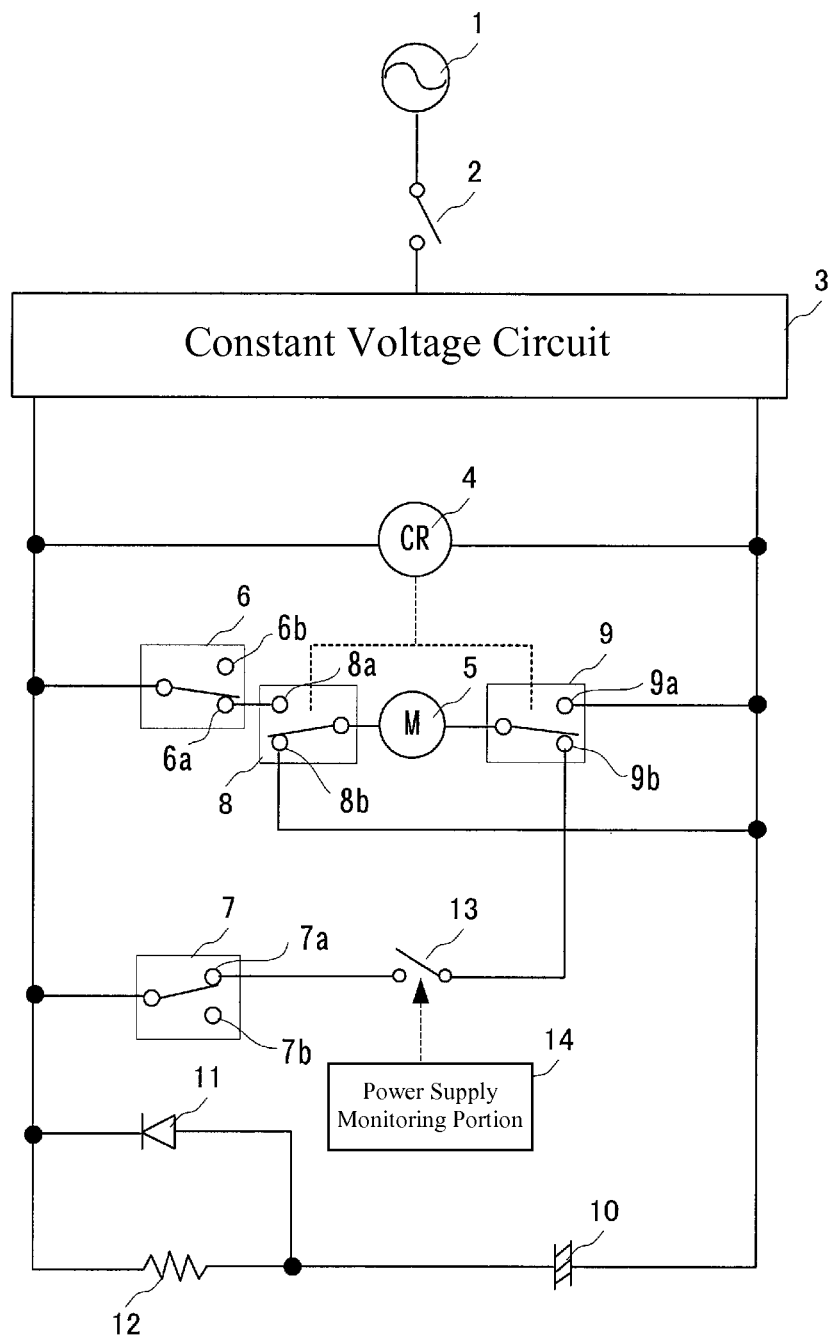
FIG. 21 is a diagram illustrating a motor driving circuit contemplating the application of the technology described in the JP '207.

In this example, a full-open instruction is received as an opening instruction, and the controlled element is driven in the fully open direction, so the output shaft 37 is operated until the fully open angle θo for when electrically driven open/closed. When the output shaft 37 reaches the fully open angle θo for when electrically driven open/closed, then, as shown in FIG. 11, the protrusion 38a of the electricity storing body conductivity state switching switch cam 38 that is secured fitted on the upper portion 37a of the output shaft 37 presses the lever 31a of the electricity storing body conductivity state switching switch 31 downward, closing the electricity storing body conductivity state switching switch 31 (referencing FIG. 19).

As a result, at the point in time that power is restored after maintenance has been completed, the electricity storing body conductivity state switching switch 31 is switched automatically from open to closed, automatically restoring the normal operating state, eliminating the possibility that the operation for restoring the normal state of use may be forgotten. Moreover, the controlled element can be operated manually until the power is restored, so there are no time constraints.

Note that while in the example set forth above the point in time wherein the protrusion 38a of the electricity storing body conductivity state switching switch cam 38 presses the lever 31a of the electricity storing body conductivity state switching switch 31 downward is the point in time at which the output shaft 37 arrives at the fully open angle θo for when electrically driven open/closed, instead it may be any given point in time insofar as the point in time is after the output shaft 37 passes the fully open angle θm for when manually opened and closed.

At the point in time that the output shaft 37 reaches the fully open angle θo for when electrically driven open/closed, the opening side limit switch 26 will operate to switch to the terminal 26b side, cutting off the supply of electricity to the motor 25. In contrast, at a point in time prior to the output shaft 37 arriving at fully open angle θo for when electrically driven open/closed, the opening-side limit switch 26 will remain at the terminal 26a side, enabling the continuous provision of electricity to the motor 25, making it possible to control the degree of opening of the controlled element to a desired position.

Moreover, while in the example set forth above the electricity storing body conductivity state switching switch 31 was provided on the top face 33a of the printed substrate 33, instead the upper portion 37a of the output shaft 37 may be positioned on the bottom face 33b side of the printed substrate 33 and the electricity storing body conductivity state switching switch 31 may be provided on the bottom face 33b of the printed substrate 33.

EXTENDED EXAMPLES

While the present invention has been explained above in reference to examples, the present invention is not limited to the examples set forth above. The structures and details in the present invention may be varied in a variety of ways, as can be understood by one skilled in the art, within the scope of technology in the present invention. Moreover, the present invention may be embodied through combining the various examples, insofar as there are no contradictions.

The invention claimed is:

1. An electric actuator comprising: a motor that receives a supply of electric power from an external power supply to drive a controlled element; an electricity storing body that is charged through receiving a supply of electric power from the external power supply, wherein, at a time wherein the external power supply is cut off, the motor is driven forcibly by electric power stored in the electricity storing body, and when an arrival of a controlled element, driven by the motor, at a specific first opening is detected, the supply of electric power from the electricity storing body to the motor is cut off; a manual operating unit wherein, in a state wherein the controlled element has arrived at the first opening and the supply of electric power to the motor from the electricity storing body is cut off, the motor and the controlled element are in a non-linked state only while a button is pushed; a switch that is provided in a supply path of electric power from the electricity storing body to the motor and keeps the supply path of electric power open when the button has been pressed once; and a resetting unit that closes the switch at a point in time that the controlled element that is driven by the motor arrives at a specific second opening at a time of restoration of the external power supply in a state wherein the non-linked state of the motor and the controlled element by the button has been undone, wherein the manual operating unit makes the switch remain at a terminal opening-side at a point in time prior to the controlled element arriving at a fully open angle (theta) when the controlled element is electrically driven to one of open or closed state.

2. The electric actuator as set forth in claim 1, further comprising:

an opening constraining unit that constrains the opening of the controlled element so as to not be able to change to the second opening by the manual operating unit when the motor and the controlled element are in a non-linked state.

3. The electric actuator as set forth in claim 1, further comprising:

a handle for assisting the change in opening of the controlled element when the motor and the controlled element are in a non-linked state through the manual operating unit.

4. The electric actuator as set forth in claim 1, wherein the manual operating unit is a button and a rod-shaped member having a first protrusion for putting the motor and the controlled element into a non-linked state, and a second protrusion for opening the switch.

5. The electric actuator as set forth in claim 1, wherein:
the resetting unit is a cam that closes the switch at a point in time that controlled element, driven by the motor, arrives at a specific second opening.

* * * * *